Patented Apr. 26, 1938

2,115,621

UNITED STATES PATENT OFFICE 2,115,621

SUPRARENAL CORTICAL HORMONE

Karoly Gyula David, Amsterdam, Netherlands, assignor to the firm N. V. Organon, Oss, Netherlands No Drawing. Application February 17, 1937, Serial No. 126,305. In the Netherlands February 15, 1936

9 Claims. (Cl. 167—77)

This invention relates to methods of purifying the suprarenal cortical hormone, particularly solutions of this hormone in organic solvents with strong acids, and has as a general object the provision of a novel process for such treatment and more specially a process for the preparation of therapeutic preparations. Another object of the invention is to provide means to separate the suprarenal cortical hormone from impurities derived from suprarenals. A further object is to provide a process for the manufacture of solutions which may be injected into mammals without side reactions and which contain the hormone of the suprarenal capsule being essential to life.

It is known that it is necessary to purify the suprarenal cortical hormone to avoid side reactions when injecting the preparation into mammals. For instance when preparing the suprarenal cortical hormone from natural sources such as suprarenals, it is necessary to remove proteins and the hormone of the suprarenal medulla. Various methods of accomplishing this result have been described in literature (Grollmann and Firor, J. Biol. Chem. 100, 429, 1933; Kendall, Proc. Am. Soc. Biol. Chem. 8, 59, 1933; Pfiffner et al., Proc. Soc. Exp. Biol. Med. 29, 998, 1932; 29, 1267, 1932; J. Biol. Chem. 106, 625, 639, 645, 1934).

Generally a part of the proteins is removed first, whereupon special purification from the hormone of the suprarenal medulla must take place, whereby generally a great deal of the suprarenal cortical hormone is also removed.

In accordance with the principles of the present invention, I have found that solutions of suprarenal cortical hormone in organic solutions may be extracted with strong acids, especially sulphuric acid without destroying the suprarenal cortical homone and I have further found that said hormone may be recovered from the acid layer. This was very surprising in view of the fact that suprarenal cortical hormone is known to be extremely sensible to chemical influences, for instance n/10—NaOH by which it is destroyed within an hour at 20° C. (Hartman, Proc. Soc. Exp. Biol. Med. 28, 962, 1931).

The process of this invention consists therein that material containing the suprarenal cortical hormone is extracted with organic solutions and that the resulting extract in the organic solvent is treated with a strong acid. Thereupon the acid layer is diluted with water, whereupon this solution is extracted with solvents being immiscible with water. After removing the solvent the suprarenal cortical hormone is obtained in a purified state. When diluting the acid layer with water care must be taken to avoid increase of temperature which is known to take place when diluting various concentrated acids. This may be executed by cooling the liquids and by adding slowly the one to the other. Before extraction of the diluted acid is executed with solvents immiscible with water, the liquid may be neutralized.

The raw products being used for these processes may already be purified by other methods. It is also possible to insert these processes into a series of other processes for purification. The best results are however obtained in executing this purification according to this invention as the last step.

I wish it to be understood that I do not desire to be limited to the exact details described for obvious modifications will occur to a person skilled in the art. The invention is further illustrated by the following examples without being restricted thereto:

*Example 1.*—62 kgs. of suprarenals are extracted according to Pfiffner et al. (J. Biol. Chem. 106, 625, 639, 645, 1934) and worked up according to the process described therein until the distribution between petroleumether and alcohol inclusive, thus without removing the hormone of the suprarenal medulla, being present in both layers to a great amount. The alcoholic layer is evaporated at 40° C. in vacuo, the residue (about 180 g.) is dissolved in 1.8 litres of benzene. The benzene is extracted twice with 250 c. c. 60% sulphuric acid and once with 250 c. c. 75% sulphuric acid. The separated united sulphuric acid layers are poured into 3 liters of ice water and extracted once with 3 litres and thereupon nine times with about 2 litres of ether, which has been distillated shortly before. The ether solution thereupon is shaken with some sodium bicarbonate, set aside for some hours and dried by adding some anhydric sodium sulfate. After filtration the ether is evaporated, leaving a dry residue of 20.4 mg. per kilogram suprarenal. This preparation is dissolved in oil and proves to have strong activity in doses corresponding to 100 g. suprarenal, when being administered to an adrenalectomized dog. It is also active when examined with the treadmill method according to Kooy (Acta Brevia Neerlandica 3, 114, 1933) and when measuring the time of survival of adrenalectomized rats injected with the preparation. Examination with the Everse-de Fremery-test (Acta Brev. Neerl.

2, 152, 1932) shows that 3 out of 5 rats are positive if a quantity corresponding to 50 g. suprarenal is injected and 4 out of 5 rats are positive when a quantity corresponding to 100 g. suprarenal is administered. This preparation causes only a very slight depression of blood pressure at adrenalectomized cats and therefore may be used for subcutaneous injections with humans. Indeed, a preparation being perfectly prepared according to Pfiffner and Swingle c. s. (loc. cit.) and which had been freed from the hormone of the suprarenal medulla, was also active but only 1 out of 5 rats was positive when doses corresponding to 50 g. suprarenal were injected. Also the dry residue of this preparation was 2.4 g. per kilogram suprarenal.

Example 2.—6 kg. of suprarenals are purified according to Pfiffner et al. and treated with permutite exactly as described in Example 1. The residue (about 18 g.) is dissolved in 180 c. c. of ether. The ether is extracted twice with 25 c. c. 25% HCl and once with 25 c. c. 30% HCl. The hydrochloric acid layer is poured into 400 c. c. of water and extracted 8 times with 200 c. c. of ether distilled a short time before. The ether layers are united and treated with sodium bicarbonate and anhydric sodium sulfate in the way described in Example 1. The filtered solution is evaporated leaving a dry residue of which 46 mg. correspond to one kilogram of suprarenal. This preparation is also biologically active, when administered to adrenalectomized rats and dogs according to the methods mentioned in Example 1 and 4 out of 5 rats injected are positive when a quantity corresponding to 100 g. suprarenal is tested according to Everse-de Fremery.

I claim:

1. In the process of purifying the suprarenal cortical hormone, the step of extracting impure solutions of the suprarenal cortical hormone in organic solvents with strong concentrations of strong acids, said solvents being immiscible with water.

2. In the process of purifying the suprarenal cortical hormone the step of extracting impure solutions of the suprarenal cortical hormone in organic solvents with 60%–75% sulphuric acid, said solvents being immiscible with 60–75 percent sulphuric acid.

3. In the process of purifying suprarenal cortical hormone the step of extracting impure solutions of the suprarenal cortical hormone in petroleum ether with 60%–75% sulphuric acid.

4. The process of claim 1, in which the acid layer is diluted with water, whereupon the suprarenal cortical hormone is extracted with an organic solvent immiscible with water and whereafter the solvent is evaporated.

5. The process of claim 1, as applied to a solution of the suprarenal cortical hormone being prepared from suprarenals and being partially freed from impurities.

6. The process in which is used as a starting material a solution of suprarenal cortical hormone prepared from suprarenals, in an organic solvent immiscible with water, partially freed from impurities and wherein said solution is extracted a plurality of times with progressively increasing strong concentrations of strong acids, the acid layers being diluted with water, whereafter the diluted acid solutions are extracted with organic solvents immiscible with water whereafter subsequently the solvent is evaporated.

7. A process for the purification of the suprarenal cortical hormone which comprises preparing an impure solution of the suprarenal cortical hormone from suprarenal material by extracting the same with an organic solvent immiscible with water, extracting said solution with a high concentration of strong acid, diluting the acid extract with water, extracting the suprarenal cortical hormone with an organic solvent immiscible with water, separating the extract and evaporating the solvent therefrom.

8. A process for the purification of the suprarenal cortical hormone which comprises preparing an impure solution of the suprarenal cortical homone from suprarenal material by extracting the same with an organic solvent immiscible with water, extracting the solution with 60% sulphuric acid, separating the sulphuric acid layer, extracting the remaining solution with 75% sulphuric acid, separating the sulphuric acid layer, uniting the said acid layers, diluting the combined acid extracts with water, extracting with ether, and evaporating the ether, thus leaving a dry residue of suprarenal cortical hormone.

9. In the process for the purification of suprarenal cortical hormone, the step of extracting impure solutions of the suprarenal cortical hormone in an organic solvent with a strong solution of a strong acid, said solvent being immiscible with said strong solution.

KAROLY GYULA DAVID.